United States Patent [19]
Tomelleri

[11] 3,835,765
[45] Sept. 17, 1974

[54] APPARATUS FOR DESTONING AND HALVING FRUIT

[75] Inventor: Giordano Tomelleri, Verona, Italy

[73] Assignee: FMC Corporation, San Jose, Calif.

[22] Filed: Aug. 3, 1972

[21] Appl. No.: 277,910

[30] Foreign Application Priority Data
Dec. 30, 1971 Italy.................................. 84994/71

[52] U.S. Cl. ................................................ 99/553
[51] Int. Cl............................................. A23n 3/08
[58] Field of Search ............ 99/537, 538, 544, 545, 99/547, 549, 551, 552, 553, 557

[56] References Cited
UNITED STATES PATENTS
1,480,819  1/1924  Forrester et al. ..................... 99/553
3,465,799  9/1969  Tomelleri............................. 99/553
3,633,641  1/1972  Tomelleri............................. 99/557

Primary Examiner—Leon G. Machlin
Attorney, Agent, or Firm—Richard P. Alberi

[57] ABSTRACT

A destoning and halving apparatus for peaches and like fruit with large stones, comprising an intermittently travelling conveyor receiving the fruit, a first or destoning position in which two pairs of blades are partly inserted in the fruit from opposite directions to hold it firmly, a pair of forked knives, one between each pair of blades, are inserted so as to surround the stone and are then rotated to free it, whereupon the blades and knives are removed from the fruit which is transferred to a second or halving position where it is cut completely in half by further linearly-moving blades.

3 Claims, 4 Drawing Figures

PATENTED SEP 17 1974 3,835,765

APPARATUS FOR DESTONING AND HALVING FRUIT

The invention relates to apparatus for destoning and halving peaches and similar fruits so as to avoid rough surfaces on the halved and destoned fruits, and to avoid breakage of the parts of the apparatus.

The aim of the invention is to perform the destoning operation, while the fruit is held firmly by a fruit pressing cap in a fruit support member, by four blades which penetrate the flesh of the fruit from above and below the stone.

The destoning operation is accomplished before and independently of the final flesh cutting or halving operation.

The present invention is an improvement over the devices of my U.S. Pat. Nos. 3,456,799, Sept. 9, 1969 and 3,633,641, Jan. 11, 1972 wherein destoning and halving are performed at the same station.

Also according to the present invention there is provided an apparatus for destoning and halving stone-carrying fruit comprising a row of hollow support members for the fruit, means for intermittently advancing said support members so that one is located with its axis properly oriented with respect to the destoning means, the said means comprising a first two pairs of opposed blades, the said pairs moving towards one another during a stationary period of the hollow support members so that the pairs of blades partially pass through the fruit, one pair stopping with their cutting edges above the stone, the other pair under the stone, and further comprising a pair of forked knives with curved prongs of different lengths, one for each knife, means for rotating the knives around the stone to remove it from the flesh while the fruit is held in the hollow support member by the blades, and a cap pressing on the fruit during said operation.

Reference is now made to the accompanying drawings in which a preferred embodiment of the invention is shown.

In each figure the same or equivalent parts are correspondingly referenced.

Figure 1:
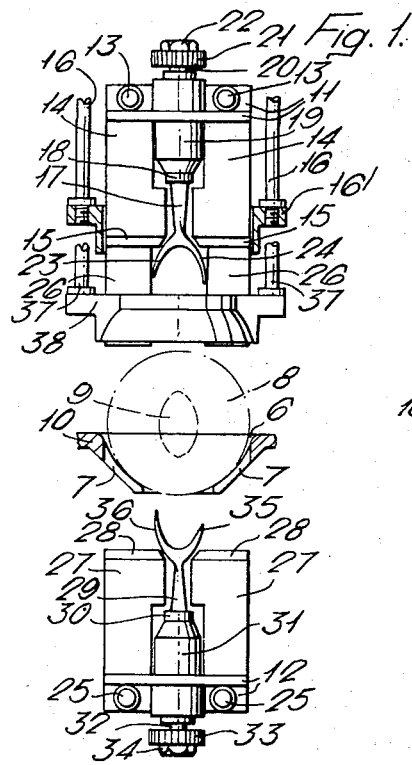
FIG. 1 is a front part-section of the apparatus, in a resting position.
Figure 2:
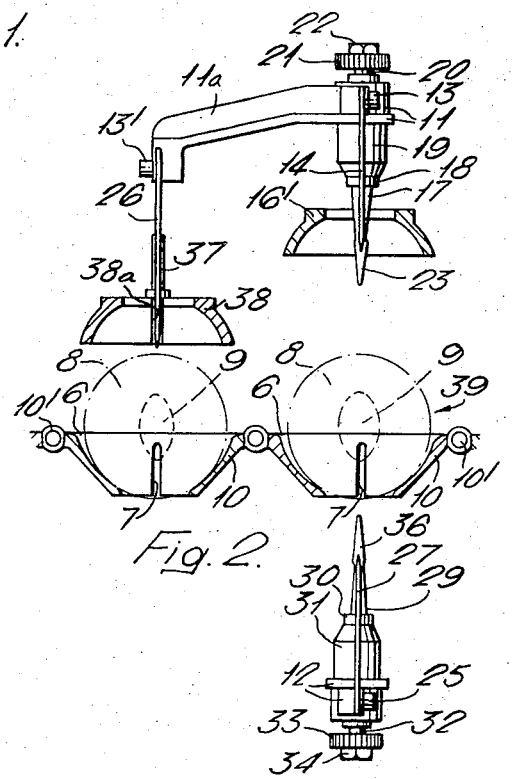
FIG. 2 is a lateral part-section of FIG. 1.

FIGS. 1 and 2 show a conveyor belt 10 with plates connected to each other by hinges 10', and provided with hollow supporting cup members 6 for the fruit. The hollow members 6 have open bottom and lateral windows 7 allowing the passage of the blades when they operate on the lower part of the fruit 8, each of which contains a stone 9. The belt conveyor 10 advances intermittently in the direction of the arrow 39 (FIG. 2) and when stationary, plates 11 and 12 are located respectively over and under the fruit supporting elements.

Figure 4:
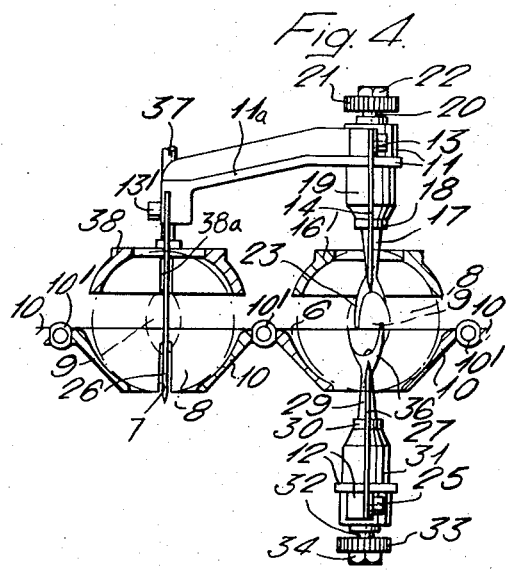
FIG. 4 is a lateral part-section of FIG. 3 showing that the destoning operation is carried out first and independently from the flesh-cutting operation for the same fruit.

During the stoning operation the plates 11 and 12 are moved one towards the other so that the destoning elements penetrate through the flesh part of a fruit to grip the stone (fruit to the right of FIG. 4) while the halving members cut a fruit previously destoned (fruit to the left of FIG. 4). Plate 11 mounts a bracket 11a (FIGS. 2 and 4) that carries two blades 14 with cutting edges 15 which blades are secured to the bracket 11a by fixing elements 13. Between the blades 14 there is a rod 17 terminating in curved prongs 23 – 24 one of which is longer than the other to provide a forked destoning knife. The upper end of the rod 17 is lodged in a housing 19, and is connected to the shaft 20 of a gear wheel 21 fastened in position by a nut 22. The rod 17 has a flange 18 near its upper end, and the gear wheel 21 engages a rack (not illustrated) which is movable by a motor, thus rotating the gear wheel 21 which rotates the rod 17 and the prongs 23 and 24 of the upper destoning knife so that the flesh of the fruit is separated from the upper part of the stone. The blades 14 absorb the torque generated by the upper destoning knife.

The lower plate 12 carries torque blades 27 with cutting edges 28 by means of fixing elements 25 which, during the operative stage, (see FIG. 4) penetrate through the flesh of the fruit under the stone and partially cut the flesh while the torque blades 14 cut similarly into the upper part of the fruit and also help to keep the fruit firm, during the destoning operation, this being assisted by the fruit-pressing cap 16' which is lowered with a gentle pressure on the fruit by means of supporting rods 16 FIGS. 1 and 4 fixed to the head of the machine (not illustrated).

Figure 3:
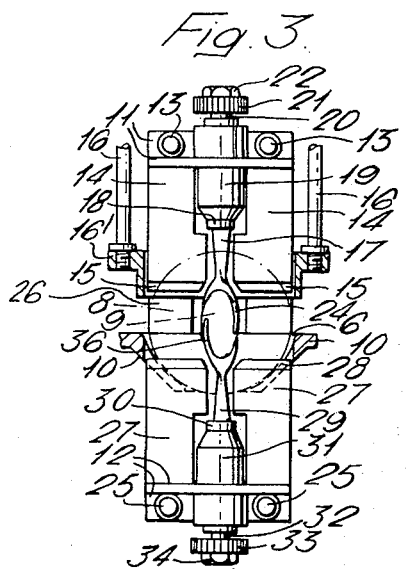
FIG. 3 is a front part-section of the apparatus with the destoning means in an operative position.

As described for the plate 11, plate 12 carries a rod 29, having at its upper end a forked knife with curved prongs 35 and 36 complementary to the prongs 23 and 24; this rod is connected at its other end to a shaft 32 of a gear wheel 33 which is fastened thereto by means of a nut 34. The rod 29 has a flange 30 and is lodged in a housing 31 which is fixed to the plate 12 and is rotated by an action identical to the one described for the rod 17. Referring to FIG. 3, it should be noted that the separation of the flesh of the fruit 8 from the stone 9 is complete even if the tips of the prongs of one destoning knife are separated from the prongs of the other destoning knife, because the knives accomplish more than one complete revolution around their axis. Even if a fruit stops in a position corresponding to the axis of the destoning apparatus, but not in the best-oriented position, the stone will never encounter the blades 14 and 27 during the destoning operation, consequently any possibility of breakage of these blades is avoided. In the aforesaid known apparatus, in which the destoning operation follows the halving operation, the stone of a wrongly oriented fruit, could foul the halving blades, which remain in the flesh of the fruit till the end of the destoning operation, thus causing breakage of the prongs of the forked knives.

After the destoning operation, the conveyor belt 10 advances a step in the direction of the arrow 39 to set the destoned fruit on the axis of the halving apparatus, while another fruit ready to be destoned is located on the axis of the destoning apparatus.

As shown in FIGS. 2 and 4 the halving apparatus is supported on the bracket 11a by means of fixing elements 13'. It consists of two blades 26 which are slidable in slots 38a of the fruit pressing cap 38, the latter being lowered on the fruit with a light pressure by means of the supporting rods 37 (FIG. 1) which are fixed to the head of the machine (not illustrated).

It can be seen from FIG. 4 that while a fruit is destoned by the device which is fixed on the plates 11 and 12, a second fruit, previously destoned, is halved by the halving blades 26 fixed on the bracket 11a attached to the plate 11.

I claim:

1. Apparatus for destoning and halving stone-carrying fruit, said apparatus comprising a row of fruit supporting cups that are intermittently indexed, destoning means comprising upper and lower vertical axis forked destoning knives each knife having curved prongs freely projecting from a base, means for rotating said forked knives around the stone to perform a stone freeing operation when said forked knives are moved toward one another and into a fruit in one of said cups, and flesh cutting blades at said destoning knives; the improvement wherein the stone freeing operation is performed at a first station and the fruit is completely halved at a second station, said first station comprising opposed upper and lower sets of flesh cutting torque blades flanking said upper and lower destoning knives and movable toward one another, said torque blades terminating at the bases of associated destoning knives so as to clear the stone in the fruit and make partial cuts leaving flesh at each side of the stone uncut, said second station comprising long halving blades that are laterally spaced to clear the stone and complete the partial cuts made by said torque blades for completely halving the fruit, and caps at each station for holding fruit down in said cups.

2. The apparatus of claim 1, wherein said halving blades are spaced from each other by a distance that exceeds the internal spacing of said destoning knife prongs for clearing misaligned stones.

3. The apparatus of claim 2, wherein said halving blades are both mounted on a bracket disposed above one of said cups, which bracket moves toward the fruit with said upper destoning knife.

* * * * *